United States Patent Office 3,206,389
Patented Sept. 14, 1965

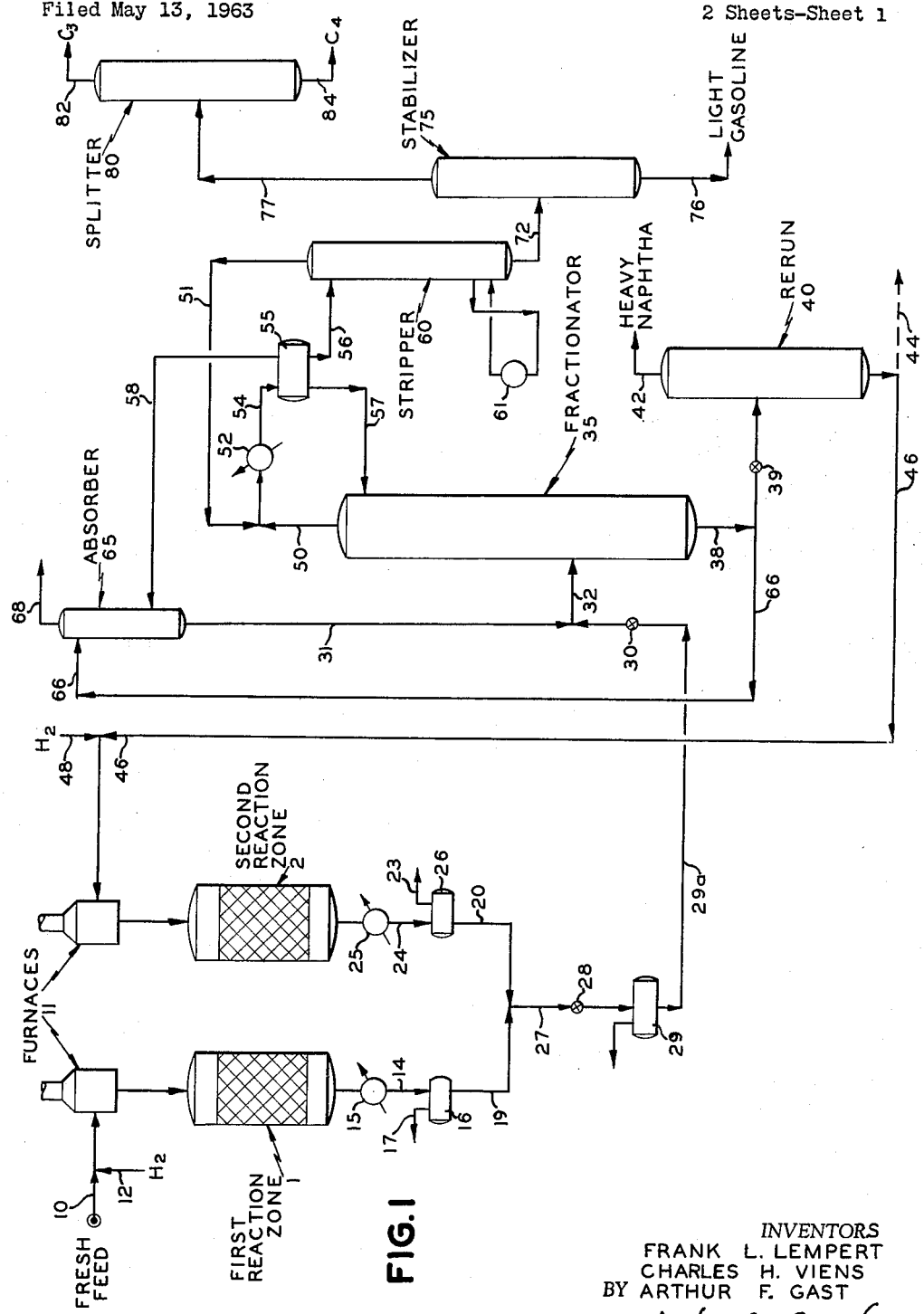

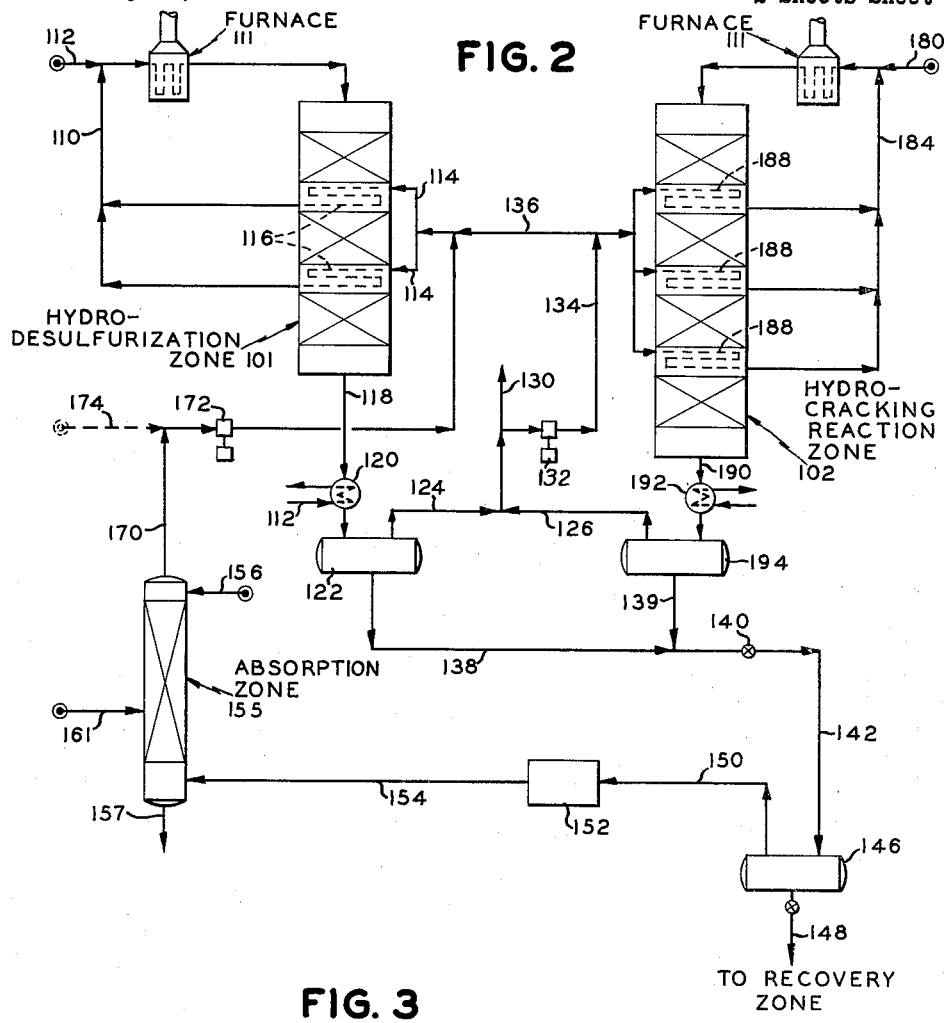

3,206,389
HYDROCRACKING PROCESS WITH DESULFURI-
ZATION AND DENITROGENIZATION OF THE
FEED OIL AND THE SEPARATION OF HYDRO-
GEN AND HYDROCARBON GASES FROM THE
PRODUCTS
Arthur F. Gast, Bronxville, N.Y., Frank L. Lempert,
Rutherford, N.J., and Charles H. Viens, New York,
N.Y., assignors to Pullman Incorporated, a corporation
of Delaware
Filed May 13, 1963, Ser. No. 279,907
5 Claims. (Cl. 208—58)

This invention relates to a hydrocracking process, and more specifically, it relates to a process for the desulfurization and cracking of hydrocarbon feed materials under elevated hydrogen pressures to convert such feed materials to desired lower boiling products. In one aspect, the present invention relates to an improved process for recovering and re-utilizing unreacted hydrogen from the effluent of a hydrocracking zone. In another aspect, the present invention relates to an improved method of operating a recovery zone in order to recover in the product fractions increased percentages of selected hydrocarbons contained in the hydrocracking effluent. In another aspect, the present invention relates to an improved method of effecting heat exchange in a hydrocracking reactor.

Methods are known for treating selected hydrocarbon oil fractions including light, middle and residual distillate fractions under a wide range of elevated hydrogen pressures and temperatures in the presence of suitable catalytic material. The reaction conditions and catalytic materials suitable for effecting the desired treatment of a selected hydrocarbon fraction or mixture of such fractions are known from the literature. Process data and flow sheets have been published showing the recovery of hydrocracking effluents. Such recovery processes involve different combinations of fractionation, high pressure separation, stripping, and other unit operations which combinations make such processes useful for one puropse or another, depending upon economic considerations which are affected, for example, by the feed stock to be treated, the availability of hydrogen and its cost in a given location, the extent of treated hydrocarbon product recovery desired, and utilities costs at the operation sites.

The present invention, likewise, involves particular combinations of process steps and unit operations for the more efficient recovery of hydrogen and treated hydrocarbon product from a hydrocracking effluent. The present process is useful in the treatment and recovery of a wide range of hydrocarbon fractions and their mixtures, and is advantageously employed wherever economic considerations including a high cost of hydrogen, and demand for increased recovery of a selected hydrocarbon in the products of the hydrocracking reaction, e.g., isobutane produced in a hydrocracking reaction, make it desirable to enhance hydrogen and selected hydrocarbon product recovery. Unfortunately, in the known hydrocracking processes, less than 90 percent of the isobutane produced in a hydrocracking reaction is recoverable; and hydrogen consumption is excessively high since such processes are unsuited for recovery and re-utilization of much of the unused or by-product hydrogen. The present invention, as hereinafter described, is designed to overcome such inherent disadvantages of the prior methods.

It is, therefore, an object of the present invention to overcome the inherent disadvantages of prior hydrocracking methods and to provide a more efficient hydrocracking process.

Another object of the present invention is to provide an efficient process for the recovery of hydrocarbons from a hydrocracking effluent.

Another object of the present invention is to provide a process for the recovery in a product fraction of high percentages, e.g., more than 90 percent, of a selected hydrocarbon contained in a hydrocracking effluent.

Another object of the present invention is to provide an efficient method for the recovery of hydrogen from a hydrocracking effluent and the re-utilization of such hydrogen in a hydrocracking process.

Another object of the present invention is to provide a method of effecting heat exchange in a hydrocracking reactor.

Another object of the present invention is to provide a hydrocracking process comprising hydrodesulfurization and hydrocracking of a hydrocarbon feed material in a manner more efficient than in the known processes, in which improved process hydrogen recovery and heat exchange are enhanced and an increased percentage of isobutane produced in the hydrocracking reaction is recovered in a product fraction by means of an improved product recovery zone.

Other objects and advantages of the present invention will become apparent to those skilled in the art from the following description and disclosure.

Generally, in accordance with the present invention, a hydrocarbon feed stream is introduced to a hydrocracking zone containing suitable catalyst material and maintained under elevated temperature and pressure conditions in the presence of hydrogen in order to effect a desired reaction to obtain an effluent comprising unreacted hydrogen and treated hydrocarbon. A gaseous stream containing hydrogen is separated from the effluent and the remaining portion thereof is passed to a downstream recovery zone to recover hydrocarbon product and recycle streams. The separated gaseous stream containing hydrogen is recovered and re-utilized in a hydrocracking process. It should be understood that the terms "hydrocracking process" and "hydrocracking zone" are intended to mean a process or a zone wherein hydrocracking, hydrodesulfurization, and denitrification reactions are carried out, while the term "hydrocracking reaction zone" refers to a zone wherein the cracking reaction, itself, is carried out.

Hydrocarbon feed streams comprising light, middle and residual distillate fractions and mixtures thereof, can be employed as feed material in the present process by adjusting reaction conditions and selecting suitable catalytic materials known in the art; and the thus-obtained hydrocracking zone effluents can be treated to remove unreacted hydrogen, and then to recover treated hydrocarbons in accordance with the present invention.

In accordance with one embodiment of the present invention, a first suitable catalytic reaction zone is maintained under an elevated hydrogen pressure and temperature to effect desulfurization of the hydrocarbon feed material; and a second reaction zone containing suitable catalytic material is maintained under conditions including an elevated hydrogen pressure and temperature to effect hydrocracking of hydrocarbon material fed thereto. Hydrocracking zone effluents comprising treated hydrocarbon and unused hydrogen are separately withdrawn from the reaction zones. Gaseous material, rich in hydrogen, is separated from the separately obtained hydrocracking zone effluents which are thereafter combined. Gaseous material comprising the remaining hydrogen in the combined effluent is separated from the combined liquid effluent, which liquid effluent is then passed to a suitable downstream recovery zone, e.g., the recovery zone provided in accordance with the recovery aspect of the present invention as hereinafter described, in order to recover a treated hydrocarbon product fraction and a recycle stream.

The gaseous material comprising the remaining hydrogen separated from the combined effluent can be re-utilized in the present invention by upgrading the hydrogen concentration of such gaseous material by subjecting the same to suitable hydrogen purification method and then returning purified hydrogen to a hydrocracking zone. The purified hydrogen can be recycled alone or in a combined stream with the hydrogen-rich gaseous material separated from the separately obtained liquid effluents hereinbefore mentioned. The recycled hydrogen can be injected as quench material into the hydrocracking reactors in the manner known in the art; but it is preferred to utilize such hydrogen in indirect heat exchange in a hydrocracking zone and thereafter to pass the thus-heated hydrogen gaseous material to the inlet side of a hydrocracking reaction zone in accordance with another aspect of the present invention which is hereinafter more fully described.

It is to be understood that the several aspects and numerous novel features described herein are capable of use in an integrated process wherein each element coacts with each and every other element in the combination to provide an overall hydrocracking process of improved efficiency. On the other hand, under circumstances which will become apparent from this disclosure, each aspect and element is capable of advantageous use in combination with other hydrocracking methods.

The relationship of pressure conditions among the several portions of the hydrogen recovery and re-utilization aspect of the present invention has been found to be important. In this regard, it is preferred to separate hydrogen-rich gaseous material from the separate hydrocracker effluents under an elevated pressure which is not substantially less than the elevated pressure maintained in the hydrocracking zones. It is also preferred to maintain the aforementioned hydrocracking zones under substantially the same elevated pressure to minimize compression costs in the gaseous hydrogen recycle system. It is preferred to reduce the pressure on the combined hydrocracking liquid effluents in order to separate therefrom the remaining hydrogen. The hydrogen-rich gaseous material thus obtained is preferably pressurized, most preferably to a pressure above the pressure maintained at the inlet side of the hydrocracking zone, passed at such elevated pressure in indirect heat exchange in a hydrocracking zone and thence without further compression to the inlet side of the hydrocracking zone.

A liquid effluent of a hydrocracking zone, having been reduced in its hydrogen concentration, is passed to a downstream recovery zone as previously mentioned to recover a treated hydrocarbon product stream and recycle in accordance with the hydrocarbon recovery aspect of the present invention. In accordance with this aspect, a method is provided for recovering an increased percentage of a selected hydrocarbon in a product fraction. Accordingly, a hydrocracking reaction zone effluent containing an appreciable amount of a selected hydrocarbon, e.g., isobutane, is provided at an elevated pressure. The pressure on such effluent is reduced and the effluent is passed to a primary fractionation zone to separate a bottoms stream and an overhead stream.

As employed in this application, the terms "overhead" and "bottoms" used in connection with the primary fractionation zone denote fractions withdrawn from an upper and lower portion of such fractionator, respectively. Such terms should be broadly interpreted to mean lower and higher boiling fractions, respectively.

In accordance with the present invention, the primary fractionation zone is operated in such a fashion that substantially all of the selected hydrocarbon in the hydrocracking reaction zone effluent is recovered in the primary fractionator overhead. At least a portion of the bottom stream from the primary fractionator is returned for further treatment in a hydrocarbon zone and, preferably, a second portion is passed to a downstream absorption zone to be employed therein as absorbent to recover selected hydrocarbon from a gaseous stream introduced to the same absorption zone from a separation zone hereinafter described. The overhead stream from the primary fractionation zone is cooled and separated in a separation zone into a liquid stream and a gaseous stream. The gaseous stream is passed to the aforementioned absorption zone in order to remove therefrom substantially all of the selected hydrocarbon by absorbing the same, together with other higher boiling materials, into the fractionation bottoms provided as absorbent material. The absorbed mixture is passed from the absorption zone to the primary fractionation zone to separate selected hydrocarbon in the overhead from absorbent material in the bottoms, which is continually recycled to the absorption zone. Absorption of selected hydrocarbon is thus achieved without introducing extrinsic materials foreign to the system.

The liquid stream separated from the aforementioned separation zone is passed to a downstream stripping zone to separate a stripping overhead fraction, which is preferably admixed with the overhead stream of the primary fractionation zone, the mixture thereafter being treated in a separation zone as hereinabove described. A stripping bottom stream is recovered from the stripping zone containing a major portion of the selected hydrocarbon originally contained in the feed to the primary fractionation zone. Such selected hydrocarbon is thereafter recovered by suitable separation methods.

The above generally described recovery system is particularly advantageous for recovering isobutane produced in the hydrocracking of selected hydrocarbon feed stocks and in accordance with the above outlined process, more than 90 percent of the isobutane produced in a hydrocracking reaction can be recovered in product fraction. In the recovery of isobutane, as the selected hydrocarbon, it is preferred to pass a bottoms fraction from the stripping tower to a stabilizer tower wherein a light gasoline fraction is separated from the bottom of the tower and a $C_3$–$C_4$ fraction is recovered overhead and passed to a splitter tower. The splitter tower is operated such that the isobutane is recovered from the bottom thereof. Preferably, the stabilizer tower is operated at a pressure lower than the primary fractionator and the splitter is operated at a pressure higher than the stabilizer. The terms used to describe the several fractionation towers referred to in this application, e.g., stabilizer and splitter towers referred to above, have a well-defined meaning known to those in the art, consequently elaboration on the construction and operation of such fractionator units is unnecessary.

In a preferred embodiment of the above-described recovery process, the primary fractionation zone is operated at a pressure in excess of the pressure maintained in the absorption and stripping zones such that the gaseous portion of the overhead stream derived from the primary fractionation zone can be passed to the absorption zone from the aforementioned separation zone without the necessity of further compression. It is also preferred to pass at least a portion of the primary fractionation zone bottoms to another fractionation zone known as a rerun tower, preferably operated at a pressure below that maintained in the primary fractionation zone in order to separate a product fraction overhead and a higher boiling bottoms fraction which is thereafter recycled in whole or in part to a hydrocracking reaction zone. It is also contemplated, in another embodiment, to pass the entire primary fractionation bottoms stream directly as feed to a hydrocracking zone without passing such stream to a rerun tower for further separation.

In accordance with another aspect of the present invention, a hydrocarbon feed material is treated in a hydrocracking zone containing suitable catalytic material under an elevated hydrogen pressure to obtain an effluent comprising treated hydrocarbon and unreacted hydrogen. A gaseous stream comprising unreacted hydrogen is recovered from the effluent and thereafter passed in indirect heat exchange with material undergoing reaction in a hydrocracking zone, thereby extracting a portion of the exothermic heat of reaction into the gaseous stream which is thereby preheated. It is preferred to pressurize the gaseous stream comprising hydrogen recovered from the hydrocracking zone effluent to a pressure level in excess of that maintained at the inlet side of the hydrocracking zone prior to the heat exchange step in order that the heated hydrogen stream can be introduced without further compression to the hydrocarbon feed material to the reactor. In the practice of the present invention, it has been found desirable to introduce the recycle hydrogen as well as make-up hydrogen which is needed at the inlet of the hydrocracking zone rather than at successive points along the path of flow in the hydrocracking zone, as in accordance with the practice in the past. Based on the same cost of compression and based on the same hydrogen to oil ratio at the outlet of the reaction zone, the present method which includes passing the hydrogen in indirect heat exchange and thence to the inlet side of the reactor provides more favorable reaction conditions by way of higher hydrogen concentration throughout the reaction zone, as compared with the known method.

Another aspect of the present invention relates to an improved method for recovering unconsumed hydrogen from the effluent of a hydrogen-consuming reaction, such as a hydrocracking or hydrodesulfurization reaction. In accordance with this aspect of the present invention, an effluent comprising hydrogen and treated hydrocarbon, is cooled and separated at about the same elevated pressure employed in the reaction to produce a hydrogen-rich gaseous stream and a liquid effluent containing residual hydrogen. Residual hydrogen is thereafter recovered at a reduced level of pressure intermediate between the high pressure employed in the separation of hydrogen from the hydrocracking zone effluent and the reduced pressure maintained in a downstream hydrocarbon recovery zone to which hydrocarbon substantially reduced in hydrogen content is passed. A suitable intermediate pressure separation zone is therefore provided to recover a liquid hydrocarbon stream low in hydrogen content, which stream is thereafter passed to a downstream product recovery zone. The gaseous stream separated in the intermediate pressure separation zone comprises a substantial percentage of hydrogen, light hydrocarbons and impurities.

Water soluble impurities are preferably removed from the gaseous stream by washing the gaseous stream with water or other suitable material. The washed gaseous stream is thereafter passed to a suitable hydrogen purification unit, e.g., an absorption zone, which is preferably maintained under a pressure in the range of that pressure which is maintained in the intermediate pressure separation zone.

In an absorption zone employed to purify gaseous hydrogen, a lean oil is employed to absorb methane and other light hydrocarbons and to liberate substantially purified hydrogen as overhead product. The purified gaseous hydrogen stream is then compressed and returned to the hydrogen-consuming process for re-utilization therein. Employing the hydrogen recovery aspect of the present invention in a hydrocracking process, results in hydrogen savings as great as 1,000,000 standard cubic feet of hydrogen-per-day, based on a unit treating 10,000 barrels-per-day of fresh feed oil. Another advantage of this aspect of the present invention is that low purity hydrogen-containing-off-gases such as, for example, a catalytic reformer off-gas, may be employed as make-up hydrogen to the process by introducing such off-gas stream to the above-described hydrogen purification zone so as to concomitantly purify the hydrogen content of the recycle as well as the off-gas streams.

Having thus described the invention in general terms, reference is now had to the several figures of the drawings in order to provide a better understanding of the present invention.

FIGURE 1 is a diagrammatic representation of a hydrocracking process comprising hydrodesulfurization and hydrocracking reaction zones operated in accordance with the present invention and illustrating an embodiment of the recovery process of the present invention.

FIGURE 2 is a diagrammatic representation of embodiments of the hydrogen recovery, purification and indirect heat exchange aspect of the present invention.

FIGURE 3 illustrates the improved hydrogen concentration correlated against length of hydrocracking reactor achieved in accordance with one aspect of the present invention as compared with known processes.

Referring now to FIGURE 1 in the drawings, a hydrocarbon feed containing sulfur and nitrogen compounds is introduced to the process in line 10 at a suitable pressure and is admixed with hydrogen from line 12. The mixture is brought to a suitably elevated temperature in furnace 11 for treatment in reaction zone 1. Reaction zone 1 contains a suitable catalyst and is maintained under conditions of elevated temperature and pressure to effect desulfurization and denitrification of the hydrocarbon feed which is introduced thereto. A desulfurized effluent is obtained from reaction zone 1, and is withdrawn in line 14, reduced in temperature in cooler 15, and passed to separation zone 16 wherein a hydrogen-rich gaseous fraction in line 17 is separated from a liquid fraction in line 19 under an elevated pressure. It is preferred to maintain the pressure in separation zone 16 and, likewise, in zone 26 as close as possible to the pressures maintained in zones 1 and 2. The separation zones may comprise a single vessel, but a multi-flash system can also be advantageously employed. The liquid from zone 16 in line 19 and liquid in line 20 separated from the effluent of reaction zone 2 in separation zone 26 is admixed in line 27 to provide a combined stream which is passed through pressure reduction valve 28 to intermediate pressure separator 29 wherein a gaseous fraction comprising hydrogen and light hydrocarbons is separated from a hydrocarbon stream in line 29a.

The hydrocarbon stream withdrawn from separator 29 is passed through pressure reduction valve 30 in line 29a; admixed with the bottoms in line 31 obtained from absorber 65, and passed in line 32 to the primary fractionator 35. Fractionator 35 is generally maintained under a pressure between about 20 and about 175 p.s.i.g. and, in a preferred embodiment, within the upper portion of the aforementioned pressure range, i.e., between about 100 and about 175 p.s.i.g. A bottoms fraction is withdrawn in line 38 from fractionator 35 and passed through pressure reduction valve 39 to rerun tower 40. The bottoms fraction of fractionator 35 generally comprises a heavy hydrocarbon fraction including, for example, fuel oil and heavy naphtha. When the abovementioned bottoms is passed as feed to rerun tower 40, for example, a heavy naphtha fraction is separated overhead as product and withdrawn in line 42. In this case, the bottoms fraction withdrawn from rerun tower 40 comprises desulfurized fuel oil obtained from reaction zone 1 and unreacted fuel oil obtained from reaction zone 2. The above bottoms fraction is passed in line 46 to reaction zone 2 as hydrocarbon feed to that reactor. A portion of the bottoms of tower 40 may be withdrawn as product in line 44 as desired.

Referring now to reaction zone 2, a hydrogen-rich gaseous material is added in line 48 to the hydrocarbon stream in line 46 and the mixture is brought to a suitable elevated temperature in furnace 11. The heated mixture is introduced to reaction zone 2 wherein suitable elevated temperature and pressure conditions and a suitable hydrocracking catalyst are maintained to produce the desired conversion of the hydrocarbon charge. In a hydrocracking reaction an appreciable quantity of isobutane and other valuable hydrocarbons are produced. Such valuable and selected hydrocarbons can be recovered in a highly efficient manner in the recovery zone described herein. An effluent from reaction zone 2 is withdrawn in line 24, cooled to a suitable temperature for separation in cooler 25 and passed to separation zone 26 wherein a hydrogen-rich gaseous stream is withdrawn overhead in line 23 and liquid effluent is withdrawn below in line 20, as previously described. Such liquid is combined with liquid from reaction zone 1 and passed in line 27 to an intermediate pressure separator 29 to remove hydrogen and light hydrocarbons from the liquid feed to fractionator 35. The composition of a typical feed in line 29a is shown in Table I, below.

TABLE I

| Component: | M.p.h. (moles per hour) |
|---|---|
| $H_2$ | 40.9 |
| $H_2S$ | 28.5 |
| $C_1$–$C_3$ | 246.2 |
| $iC_4$ | 176.8 |
| $nC_4$ | 57.8 |
| $iC_5$ | 25.6 |
| $nC_5$ | 45.7 |
| $C_6$–$C_8$ | 696.7 |
| $C_9$–$C_{18}$ | 1357.5 |
| Total Hyd. | 2676.9 |
| Ave. mol. wt. | 126.7 |
| SG(60/60) | .76 |

Referring again to the operation of the hydrocarbon recovery zone, and more specifically to fractionator 35, an overhead fraction is separated from fractionator 35 and withdrawn in line 50. The overhead stream 51 obtained from downstream stripper 60 is introduced to the overhead from fractionator 35 in line 50. A portion of the mixture is condensed in cooler 52 and passed to separator 55 in line 54. A portion of the liquid from separator 55 is passed in line 57 to an upper portion of fractionator 35 as reflux, while another portion thereof is passed in line 56 to stripper 60. Suitable stripping action is provided in stripper 60 by means of reboiler 61. A vaporous fraction is withdrawn overhead in line 51 and passed to line 50, as previously described, in order to reduce loss of a selected hydrocarbon, e.g., isobutane from the system, and to reduce the concentration of undesired light components such as, for example, ethane, and lighter components in the product from stripper 60. Stripper bottoms are withdrawn in line 72 and passed to further product recovery as is described later herein.

Returning now to the gaseous fraction withdrawn from separator 55, such fraction is passed in line 58 to absorber 65. A suitable absorbent hydrocarbon oil is introduced to absorber 55 in line 66 to absorb substantially all of the selected hydrocarbon, e.g., isobutane contained in separator overhead 58, and to return the same in line 31 to fractionator 35. In the present recovery process, the recycle of the overhead from stripper 60 and the bottoms from absorber 65 is an important feature in increasing selected hydrocarbon recovery in the product and in reducing the loss of such hydrocarbon in tail gas. Another important advantage of such recycle is to reduce the concentration of undesirable light components such as ethane and lighter components in the recovered product. The tail gas from absorber 65 is withdrawn in line 68 and is suitable for use as fuel gas. The absorbent employed in absorber 65 may be obtained from any suitable source depending upon the selected hydrocarbon to be absorbed; however, it is preferably obtained from the bottoms of fractionator 35 for the absorption of isobutane and hydrocarbons exhibiting like absorption properties, since this procedure avoids the introduction of foreign materials to the system.

Returning now to the material withdrawn from stripper 60 in line 72 which, as previously mentioned, is passed to suitable product recovery means for recovering desired hydrocarbon product fractions, the material in line 72 is introduced to a stabilizer tower wherein a light gasoline bottoms product, for example, is separated from the system in line 76 and the overhead is passed in line 77 to a splitter tower 80. A fraction comprising $C_3$ material is separated overhead in line 81 and a fraction comprising $C_4$ material and in this case, including isobutane, is withdrawn as the bottoms product of splitter 80 in line 84.

In a preferred embodiment of the operation of the process shown in FIGURE 2, the primary fractionator 35 is maintained at a greater operating pressure than the downstream stripper 60 and absorber 65. The stabilizer 75 is, likewise, maintained at a lower pressure than fractionator 35; but splitter 80 is maintained under an increased pressure to effect the desired $C_3$–$C_4$ split. Such a pressure scheme is preferable, since compression of the gaseous overhead stream 58 from separator 55 is thereby made unnecessary in order to pass the same to absorber 65.

Table II and Table III, presented below, illustrate the hydrocarbon recovery aspect of the present invention by way of an example of operation employing the feed material in line 29a described by reference to Table I. Operating the hydrocarbon recovery system shown in FIGURE 1 under the conditions shown in Table III, the materials and the compositions are obtained as shown in Table II.

TABLE II

| Line Number: | Composition |
|---|---|
| 32 | Shown in Table I+line 31. |
| 50 | Comprises $C_1$–$C_7$ hydrocarbons. |
| 38 | Comprises $C_6$–$C_{18}$ hydrocarbons. |
| 51 | Comprises $C_1$–$C_7$, $H_2$, $H_2S$; total m.p.h. 91.3; $iC_4$, 16.2. |
| 58 | Comprises $C_1$–$C_7$, $H_2$, $H_2S$; total m.p.h. 349.6; $iC_4$, 44.8. |
| 68 | Comprises $C_1$–$C_4$, $H_2$, $H_2S$; total m.p.h. 260.0; $iC_4$, 8.7. |
| 72 | Comprises $C_2$–$C_7$, $H_2S$; total m.p.h. 619.2; $iC_4$, 168.1. |

TABLE III

| Unit number | Temperature, °F. | Pressure, p.s.i.g. |
|---|---|---|
| 35 top | 250 | 150 |
| 35 bottom | 575 | 160 |
| 55 | 100 | 145 |
| 60 top | 125 | 140 |
| 60 bottom | 200 | 145 |
| 65 | 120 | 125 |
| 75 top | 140 | 105 |
| 75 bottom | 300 | 110 |
| 80 top | 130 | 240 |
| 80 bottom | 205 | 250 |
| 40 top | 350 | 12 |
| 40 bottom | 530 | 17 |

As seen from a comparison of the isobutane content in line 29a and line 72, isobutane recovery in excess of 94 percent is achieved in the present invention.

Reference is now had to FIGURE 2 of the drawings, wherein embodiments of the hydrogen recovery and heat exchange aspects of the present invention are illustrated. In FIGURE 2, the first reaction zone 101, which is a hydrodesulfurization zone, comprises three separate catalyst beds serially spaced at suitable intervals along the path of flow of the reactants. Coils 116, or other suitable heat exchange means are provided between catalyst beds to effect indirect heat exchange in order to remove the exothermic heat of reaction. Hydrocracking reactor 102 is shown as comprising four separate catalyst beds, likewise, provided with means for effecting indirect heat exchange situated between the pairs of catalyst beds.

A suitable hydrocarbon feed stream is introduced in line 112, admixed with hydrogen in line 110, passed in furnace 111, and thence to the reaction zone 101 maintained under elevated temperature and pressure conditions to effect desulfurization and denitrification of the feed mixture. The feed mixture passes serially through the catalyst beds provided therein. A portion of the exothermic heat of reaction is removed by means of indirect heat exchange with hydrogen gas passed in lines 114 through interbed coils 116 to remove at least a portion of the exothermic heat of reaction thereby maintaining the temperature rise throughout the reactor at low level. The hydrogen stream heated in indirect heat exchange in the reaction is then passed in line 110 to the inlet side of the reaction zone 101, as previously mentioned. A desulfurized effluent is withdrawn in line 118, reduced in temperature by means of indirect heat exchanger 120, and passed to high pressure separator 122. Heat exchange is preferably achieved with hydrogen feed in line 112, as indicated. A hydrogen-rich overhead gas is withdrawn in line 124 from high pressure separator 122 and admixed with a corresponding stream in line 126. The mixed hydrogen-rich stream in line 128 is purged in line 130 to maintain the purity thereof, compressed to a suitable pressure by means of gas compressor 132 and passed in lines 134 and 136 to indirect heat exchange in reaction zones 101 and 102 described herein.

The pressure in reaction zone 101 is preferably maintained substantially the same as that in reaction zone 102 in order to minimize the horsepower requirements of recycling hydrogen gas employing a combined recycle gas compressor. The reactions are conducted within a broad range of pressure depending upon the feed stock to be treated, the catalyst employed, and other factors. Pressures within the range of between about 300 and about 3500 p.s.i.a. are known.

A suitable hydrocarbon feed stream, e.g., a fresh hydrocarbon feed, or preferably a recycled hydrocarbon stream, or mixtures thereof, is introduced in line 180, admixed with hydrogen in line 184, passed through a separate coil in furnace 111, and thence to the hydrocracking reaction zone 102. The feed mixture passes serially through the beds of catalyst provided and in indirect heat exchange with coils 188 which remove a portion of the exothermic heat of reaction from the reacting fluids. The converted effluent is withdrawn in line 190, cooled in heat exchanger 192, preferably by means of indirect heat exchange with feed in line 180, and passed to high pressure separation zone 194. A gaseous fraction rich in hydrogen is separated in line 126 from a liquid stream which is withdrawn in line 139.

The liquid in line 139, separated at an elevated pressure in separator 194, is admixed with liquid in line 138 and the mixture is passed through pressure reduction valve 140 in line 142 to intermediate pressure separation zone 146 for further recovery of the hydrogen contained therein. A hydrocarbon liquid stream is withdrawn from separator 146 and passed in line 148 to a suitable recovery zone to recover treated hydrocarbons.

A gaseous fraction is separated in intermediate pressure separator 146 which contains an appreciable percentage of hydrogen, light hydrocarbons and other impurities. The gaseous fraction is passed in line 150 to a suitable hydrogen purification zone. The material in line 150 is preferably washed with water or an amine in scrubber 152 to remove impurities such as ammonia, hydrogen sulfide and water-soluble ammonia salts, for example. The treated effluent from scrubbing zone 152 is passed in line 154 to absorption zone 155, wherein hydrogen contained therein is separated from light hydrocarbons by means of absorption in a suitable absorbent medium. A lean oil is introduced to an upper portion of absorption zone 155 in line 156 and passed downwardly in countercurrent contact with the upflowing gaseous material introduced in line 154, absorbing therefrom light hydrocarbons. The spent absorbent and absorbed materials are withdrawn from absorption zone 155 in line 157. The overhead fraction liberated in line 170 is rich in hydrogen and is compressed by means of gas compressor 172 for passage to recycle line 136 to be employed in a manner as previously described. Hydrogen of suitable purity may be added directly in line 174 to overhead line 170 in order to compensate for the hydrogen consumed in the hydrocracking reactions. It is advantageous to supply make-up hydrogen to the process in the form of hydrogen-containing-off-gas from a nearby refining process which can be obtained at a relatively low cost and purified together with recycled hydrogen. An example of such a refinery process gas is a catalytic reformer off-gas. Such a gas can be introduced to absorber 155 in line 161.

FIGURE 3 illustrates diagrammatically the hydrogen to oil ratio at successive points along the path of flow in the hydrocracking reactor 102 employing the method of hydrogen re-utilization disclosed herein, which is represented by line 400, as compared with hydrogen to oil ratios achieved in the known processes, represented by line 300, in which hydrogen is injected at a low temperature as quench streams at successive points along the path of flow in the reactor. It is apparent from the sketch that the present method constitutes a way of achieving more favorable reaction conditions with no corresponding increase in the cost of compressing the recycle gaseous material. In regard to the heat exchange feature of the present invention, it should also be pointed out that a substantial reduction in cost of construction materials is achieved in accordance with this aspect.

The following examples are presented to further illustrate the aspects of the present invention described with reference to FIGURE 2 of the drawings.

*Example 1*

This example described with reference to FIGURE 2 of the drawings, illustrates the heat exchange and hydrogen utilization aspects of the present invention. Accordingly, a mixture of light cycle oil, diesel oil, and stove oil is introduced as feed in line 112 at the rate of 137,057 pounds/hour (33.4° API gravity). The hydrocarbon stream is admixed with the gaseous stream hereinafter specified in line 110 and the mixture is passed in furnace 111 and then to reaction zone 101. Reaction zone 101 contains a cobalt-molybdena-alumina catalyst suitable for desulfurization and denitrification of the feed. The overall dimensions of reactor 101 are about 7 feet inside diameter and 80 feet in length. The conditions at the hydrocarbon feed inlet to reactor 101 are about 1643 p.s.i.g. and about 750° F.; and at the outlet, about 1560 p.s.i.g. and 775° F. A gaseous stream is passed in indirect heat exchange in coils 116 at the rate of about 6151 moles-per-hour of material of M.W. about 7.5 comprising about 77 mole percent $H_2$ under a pressure of about 1745 p.s.i.g. and an initial temperature of about 130° F. The gaseous material is heated to about 300° F. in the coils and is then passed at this temperature in line 110 to the hydrocarbon feed in line 112. In this example, about 9,600,000 B.t.u./hour are removed in coils 116 and the temperature rise across reactor 101 is limited to about 25° F.

A hydrocarbon feed mixture in line 180 is introduced to reactor 102 at the rate of 193,247 pounds/hour (41.2° API gravity). This feed is admixed with a gaseous feed hereinafter specified in line 184, passed in furnace 111 and then to reaction zone 102. The overall dimensions of reactor 102 are about 8 feet inside diameter and about 70 feet in length. Reaction zone 102 contains a hydrocracking catalyst, e.g., platnium or silica-alumina, in this example. This reaction zone is maintained under 1647 p.s.i.g. and 750° F. at the hydrocarbon inlet; and at the outlet, about 1528 p.s.i.g. and about 780° F. A gaseous stream is passed in indirect heat exchange in coils 188 at the rate of about 14,750 moles-per-hour of material of M.W. about 8.4 comprising about 72 mole percent $H_2$ under a pressure of about 1750 p.s.i.g. and an initial temperature of about 130° F. The gaseous material is heated to about 335° F. in the coils and is then passed at this temperature in line 184 to the hydrocarbon feed in line 180. In this example, about 27,900,000 B.t.u./hour are removed in coils 188 and the temperature rise across reactor 102 is limited to about 30° F.

*Example 2*

This example illustrates the temperature and pressure conditions maintained in the hydrogen recovery system and the hydrogen recovered thereby. Accordingly, an effluent is obtained in line 118 at the rate of about 6,387 moles-per-hour comprising about 3234 moles of $H_2$ and, in line 190, at the rate of about 15,192 moles-per-hour comprising about 9368 moles of $H_2$. Line 148 contains hydrocarbon material which has been treated under the conditions shown in Table IV, below, to recover hydrogen comprising about 3014 moles-per-hour of material, about 197 moles being hydrogen. Table IV, below, illustrates the conditions which are maintained in the hydrogen recovery process shown in FIGURE 2.

It should be noted that, in this example, zone 122 comprises two individual separation stages having an interstage cooler situated therebetween. It has been found preferable to employ such multi-stage separation in combination with the present hydrogen recovery system. Since the vapors recovered from the desulfurization and denitrification should be washed to remove nitrogen compounds produced in the reaction zone, it is preferable to employ the two-stage separation, as mentioned above, in order to reduce the quantity of gaseous material to be washed, as compared with the one-stage separation system. In the one-stage system, all of the gaseous effluent from the reaction zone 101 in line 124 must be washed. However, in the two-stage system, only the vapor from the first stage needs to be washed, since essentially all of the nitrogen compounds remain in the first vapor stream. Therefore, the two-stage system reduces the amount of water or other suitable washing medium necessary to remove the soluble impurities.

TABLE IV

| Unit number in Figure 2 | Temperature, °F. | Pressure, p.s.i.g. |
| --- | --- | --- |
| 122 stage 1 | 350 | 1580 |
| 122 stage 2 | 110 | 1560 |
| 194 | 110 | 1500 |
| 146 | 200 | 485 |
| 155 | 101 | 465 |

Having thus described the invention, it is to be understood that many modifications and alternatives will be apparent to those skilled in the art without departing from the scope of the present invention, which is defined in the claims. For example, it has been described with reference to the preferred embodiment of the present invention to maintain reaction zone 1 and reaction zone 2 under essentially the same elevated pressure in order to minimize the horsepower requirement for recycling recovered hydrogen gaseous material. It is, however, contemplated to maintain these reaction zones under substantially different elevated pressures under certain circumstances, e.g., where it is desired to segregate the recycle hydrogen from reaction zone 1, which may contain appreciable hydrogen sulfide to remove such constituent and separately recycle such purified hydrogen to the reaction zone.

What is claimed is:

1. A process for recovering a high percentage of a selected hydrocarbon from the effluent of a hydrocracking zone employed in the treatment of a hydrocarbon feed stream under an elevated pressure which comprises: separating unreacted hydrogen from such an effluent, and passing the remaining effluent at a pressure substantially below the reaction pressure into a fractionation zone maintained under conditions to separate a bottoms fraction and an overhead fraction containing said selected hydrocarbon, cooling and separating said overhead fraction into a first liquid fraction containing a major portion of the selected hydrocarbon and a first gaseous stream containing a minor portion thereof, contacting a suitable lean oil absorbent fraction and said first gaseous stream in an absorption zone to absorb the selected hydrocarbon from resulting tail gas into a resulting absorber bottoms stream and passing such absorber bottoms stream into the fractionation zone, said fractionation zone being maintained under a pressure above the pressure of the absorption zone such that the separated first gaseous stream flows to the absorption zone without compression thereof, stripping said first liquid fraction to obtain bottoms product containing a major portion of said selected hydrocarbon and stripper overhead, and combining said stripper overhead and said overhead fraction obtained from said fractionation zone to prevent loss of the selected hydrocarbon from the system.

2. The process of claim 1 in which unreacted hydrogen is separated from said effluent of the hydrocracking zone in a first separation zone maintained under an elevated pressure not substantially below reaction pressure, further unreacted hydrogen together with light hydrocarbon material is separated from the remaining effluent in a zone maintained under an intermediate pressure substantially below said elevated pressure, hydrogen is recovered from said light hydrocarbon material under a pressure less than said intermediate pressure in an absorption zone and is recycled to said hydrocracking zone.

3. The process of claim 2 in which at least a portion of the separated hydrogen is passed in indirect heat exchange with said hydrocarbon feed stream in said hydrocracking zone to preheat such hydrogen, and thusly preheated hydrogen is introduced into said hydrocarbon feed stream.

4. A process for recovering a high percentage of the isobutane in the effluent of a high pressure, catalytic hydrocracking reaction zone which comprises: separating unreacted hydrogen from such an effluent and passing the remaining effluent at a pressure substantially below reaction pressure into a fractionation zone maintained under conditions to separate a bottoms fraction and an overhead fraction containing isobutane, cooling and separating said overhead fraction into a first liquid fraction containing a major portion of the isobutane and a first gaseous stream containing a minor portion thereof, contacting a portion of said bottoms fraction and said first gaseous stream in an absorption zone to absorb the isobutane from resulting tail gas into an absorber bottoms stream and passing such absorber bottoms stream into the fractionation zone, said fractionation zone being maintained under a pressure above the pressure of the absorption zone such that the separated first gaseous stream flows to the absorption zone without compression thereof, stripping said first liquid fraction to obtain bottoms product containing a major portion of the isobutane and stripper overhead, and combining said overhead fraction obtained from said fractionation zone and the fractionator overhead to prevent loss of the isobutane from the system.

5. The process of claim 4 in which a portion of the effluent of said hydrocracking reaction zone is admixed with a portion of an effluent from a reaction zone maintained under conditions suitable to effect desulfurization and denitrification of a hydrocarbon feed stream thereby obtaining a combined effluent, hydrogen and light hydrocarbon material are separated from the combined effluent at an intermediate pressure substantially below reaction pressure, and the remaining combined effluent is further reduced in pressure and passed into said fractionation zone.

References Cited by the Examiner

UNITED STATES PATENTS

| | | | |
|---|---|---|---|
| 3,008,895 | 11/61 | Hansford et al. | 208—112 |
| 3,018,244 | 6/62 | Stanford et al. | 208—101 |
| 3,072,560 | 1/63 | Paterson et al. | 208—111 |

DELBERT E. GANTZ, *Primary Examiner.*

DANIEL E. WYMAN, ALPHONSO D. SULLIVAN, *Examiners.*